United States Patent [19]

Bussard

[11] 4,050,595

[45] Sept. 27, 1977

[54] BOAT TRAILER EXTENSION ASSEMBLY

[75] Inventor: Leon M. Bussard, New Port Richey, Fla.

[73] Assignees: Leon M. Bussard; C. Ed Smith, both of New Port Richey, Fla.

[21] Appl. No.: 644,971

[22] Filed: Dec. 29, 1975

[51] Int. Cl.² .............................................. B60P 3/10
[52] U.S. Cl. .................................. 214/84; 280/414 R
[58] Field of Search ................. 214/84, 505, 517, 506, 214/83.24; 280/414 R; 296/26

[56] References Cited

U.S. PATENT DOCUMENTS

| 3,084,816 | 4/1963 | Bozio | 214/83.24 |
| 3,122,245 | 2/1964 | MacKusick et al. | 214/84 |
| 3,140,003 | 7/1964 | Horner | 280/414 R X |
| 3,812,988 | 5/1974 | Pyle | 214/84 |
| 3,826,391 | 7/1974 | Prince | 214/83.24 X |

Primary Examiner—Albert J. Makay
Attorney, Agent, or Firm—Duckworth, Hobby, Orman, Allen & Pettis

[57] ABSTRACT

An accessory to be removably or fixedly attached to a boat trailer and including a support assembly having a casing means attached to the frame of the boat trailer. A cradle frame is disposed and configured to be slidably mounted within the casing of the support assembly and be positioned for longitudinal movement relative to the longitudinal axis of the boat trailer by activation of a positioning means including a winch and interconnected cable structure. Dimension and configuration as well as disposition of the cradle is such as to force it to extend outwardly from the rear of the boat trailer on which it is mounted for the purpose of delivering a boat to the surface of the water and/or retrieving it therefrom without getting the wheels or like running gear of the trailer submerged within the water itself.

8 Claims, 5 Drawing Figures

U.S. Patent  Sept. 27, 1977  4,050,595
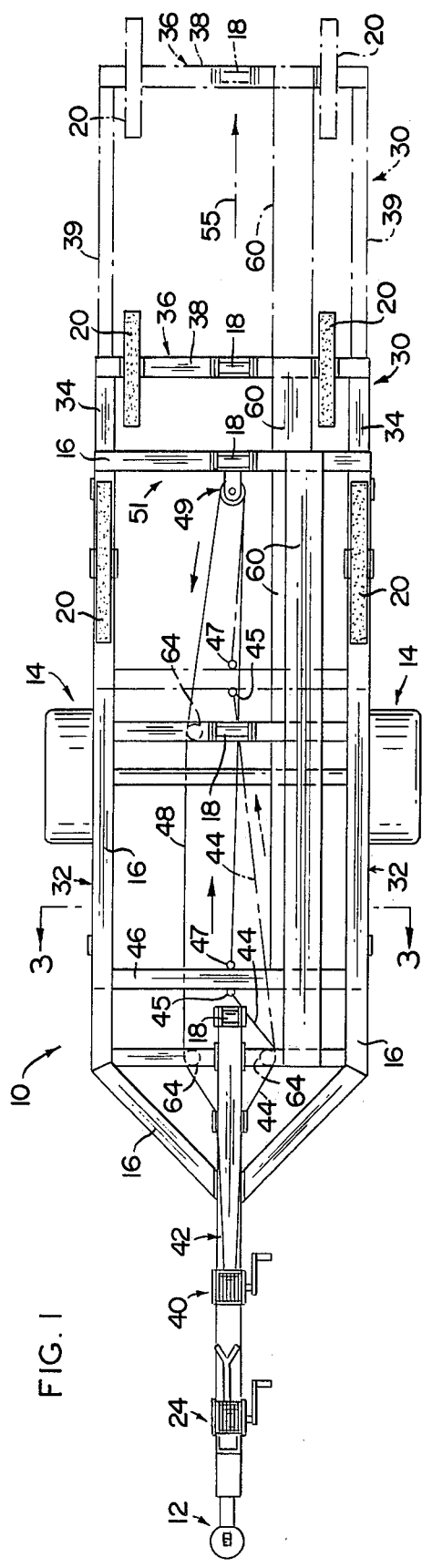
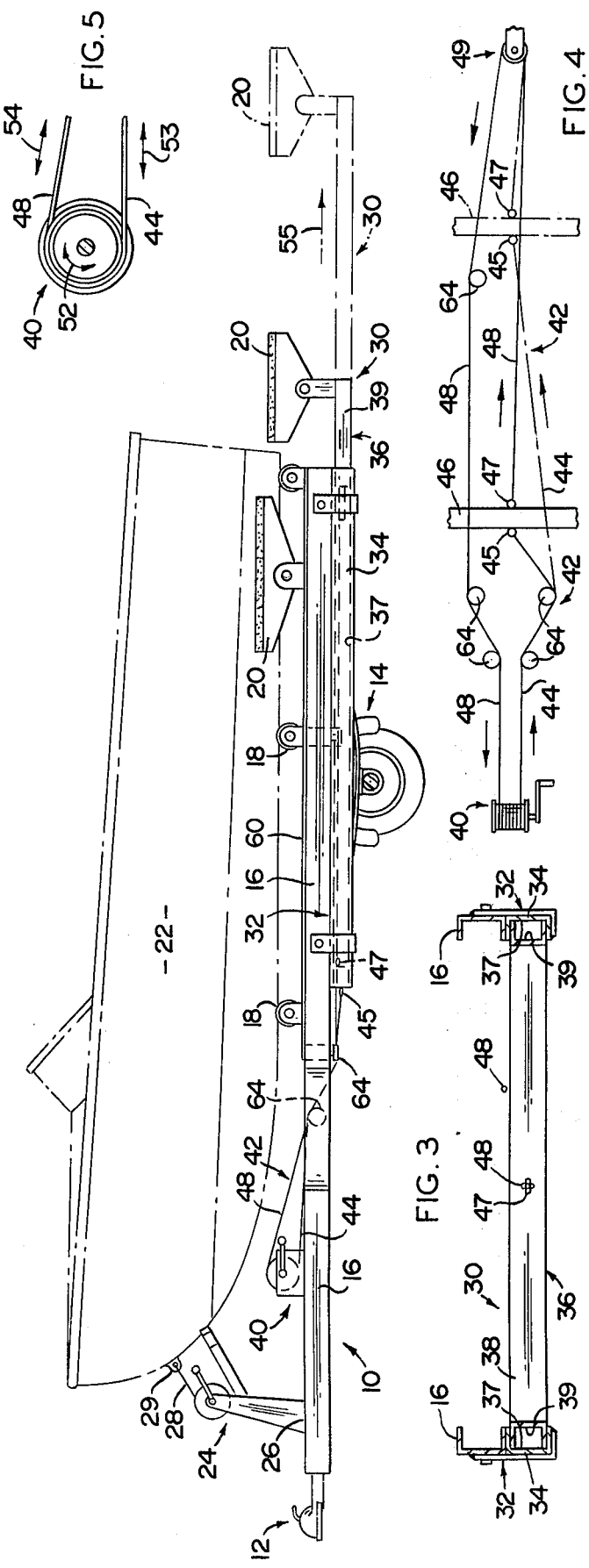
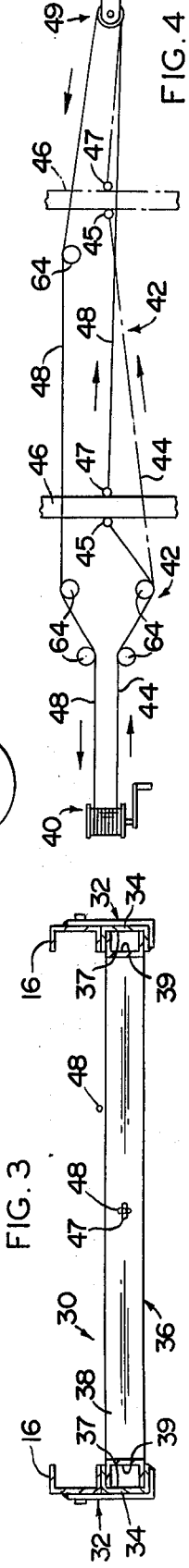

BOAT TRAILER EXTENSION ASSEMBLY

BACKGROUND OF THE INVENTION

1. Field of the Invention

This invention relates to an accessory, support assembly structure designed to be used in combination with a boat trailer for the efficient positioning of the boat on or removal from the trailer.

2. Description of the Prior Art

Portable boat trailers have been in wide use for a number of years. However, with the increase in the acceptance and popularity of leisure boating and the availability of relatively small marine craft at somewhat moderate prices, there has been an increasing need in the marine craft industry for a boat trailer type vehicle capable of both transporting a marine craft between various locations as well as properly placing the boat in a body of water and removing it therefrom.

More specifically, the common practice in the use of conventional or prior art boat trailers involves the towing vehicle such as the conventional automobile or the like to back the trailer on which the boat is mounted to the edge of the water. Due to the normal or conventional configuration of such trailers it is normally required that the running gear or wheel of the trailer actually enter the water and in some cases becomes completely submerged. This event occurs whether the boat is being removed from the trailer at a specially designed loading ramp or merely at the natural edge of a lake, river or other body of water.

This exposure of the running gear of the trailer to the water obviously has a tendency to result in relatively rapid deterioration of the trailer. This is particularly true when the environment is primarily salt water or brackish water. Another problem associated with the conventional placement of a boat in the water or removal therefrom involves the tendency of the trailer to become stuck or submerged in the soft mud or sand immediately surrounding the edge of the body of water. Upon removal of the trailer added force must be placed both on the trailer and on the towing vehicle. Naturally, such excess force required to remove the trailer from a "stuck" position increases the rate of deterioration due to the forced abusive treatment of this equipment.

In attempting to overcome such problems boat trailers have been provided which have what may be termed "extensions" built thereon and capable of being extended therefrom so as to aid in the placement of the boat or, as set forth above, the removal of the boat from the water by use of this extension. In particular, the U.S. Pat. No. 3,138,271, to De Lay discloses a boat trailer having a platform attached thereto which may be slid from the trailer. However, a review of this patent shows that it does not overcome one of the primary problems associated with the use of conventional trailers. It can be seen that use of the De Lay structure still results in the wheels of the trailer itself being exposed to the water which again hastens the deterioration of the running gear of the trailer. Similarly, the U.S. Pat. No. 3,734,046, to Schmidt, while not relating to a portable trailer per se does show a floating drydock assembly wherein a pulley system is utilized to position a platform which serves to support a boat during positioning of the boat in the water and removing it therefrom.

Similar related structures are represented in the U.S. Pat. Nos. 3,140,003, to Horner, Chatterton, 3,011,670, and Theobald, 3,390,796. Each of these structures discloses what may be termed conventional boat trailers having some type of suspended platform attached thereto or made a part thereof.

While the patents set forth above are representative of various structures commercially available or available in the prior art and again, while these structures may in fact be workable some of these structures may include certain practical and structural objections which the marine craft industry is attempting to overcome. Such objections include a number of prior art structures being overly complex both in design and operation. Such unnecessary sophistication frequently results in high maintenance cost as well as relatively high cost of initial purchase. Such design and structural complexities are especially undesirable when they do not add to the efficient and/or desired operation of the subject structure.

Accordingly, it is recognized that there is still a need in the marine craft industry in the area of boat trailers wherein some type of accessory can be designed and structured to be attached directly to boat trailers presently on the market and now in existence. Such an accessory should be capable of efficiently positioning the boat on and removal from a body of water without exposure of the running gear or like vulnerable parts of the trailer to the corrosive environment of the water, etc.

SUMMARY OF THE INVENTION

This invention relates to a boat trailer and more particularly an accessory for a boat trailer specifically structured to be fixedly or removably mounted on the trailer frame itself so as to aid in the placement or removal of a relatively small boat or like marine craft from the water.

The boat trailer accessory of the present invention includes a support assembly having a casing means attached to the frame of the boat trailer. The casing means includes at least two channel means extending in spaced relation to one another and attached along the longitudinal dimension of the trailer. Each of the channel means comprises a channel passage in which the cradle means is mounted.

More specifically, the support assembly of the trailer accessory comprises a cradle means having a cradle frame which includes at least two leg elements. The leg elements are similarly arranged in spaced relation to one another in corresponding disposition relative to the channel means of the casing means. By virtue of this configuration and disposition the leg elements of the cradle frame are slidably mounted within the channel passages and accordingly the cradle frame may be disposed along the length of the trailer frame and more importantly may be disposed to extend outwardly therefrom so as to properly position the boat relative to the surface of the water. This extended positon serves to facilitate the boat being positioned on or removed from the surface of the water.

A positioning means including a winch element and a cable assembly movably interconnected between the winch assembly and the cradle frame serves to position the cradle frame in a desired extended or non-extended position relative to the frame of the boat trailer on which the cradle means is mounted. The winch assembly itself may comprise a conventional rotatable winch fixedly secured to the frame of the boat trailer. The cable assembly comprises a first cable portion interconnected between the winch and a first strut member of the cradle frame. The cable assembly further comprises a second cable portion interconnected between the first strut of the cradle frame, a pulley assembly and successively the winch assembly.

The pulley assembly itself is mounted on a substantially rearward portion of the frame of the boat, such rearward portion being disposed in spaced relation to the first strut of the cradle frame. Accordingly by virtue of the fact that both the first cable portion and the second cable portion are both interconnected to the winch assembly and also interconnected to the cradle frame, rotation of the winch assembly in either direction causes movement of the cradle frame in opposite directions along the longitudinal dimension of the frame of the boat trailer. A plurality of guide means in the form of rollers or the like may be specifically disposed along the boat trailer frame so as to guide both the first and second cable portions along the path of travel. It should be obvious that the successive interconnection of the second cable portion between the cradle frame, pulley assembly and winch assembly causes a counteracting force to be exerted through the pulley assembly whereby rotation of the winch assembly in the proper direction causes the rearward movement of the cradle frame relative to the frame of the boat trailer.

Pulley means and runner means may be mounted on a second strut of the cradle frame which is disposed in substantially spaced relation to the first strut. Such roller and runner means serve to aid in the passing of the boat onto and off of the cradle frame when it is in its extended position relative to the bed of the trailer frame.

Accordingly, in opearation the trailer, with the boat thereon is positioned at substantially the edge of a predetermined body of water. The boat is then first disconnected from a primary winch assembly which normally accompanies the conventional boat trailer. The second winch assembly which comprises the winch assembly of the cradle means is thereby unwound which serves to move the cradle frame rearwardly into its extended position relative to the frame of the boat trailer, through operation of the second cable portion thereon. The boat then may be manually pushed along the trailer bed and the cradle frame by an operator positioning himself on a walkway extending along at least a portion of the boat trailer and along the cradle frame. The boat is merely slid from the trailer frame onto the cradle frame and into the water.

Removal of the boat from the water merely follows substantially the reverse operation.

Accordingly, this invention allows for the placement into and removal from the water of a boat without getting the running gear or other relatively vulnerable portions of the conventional boat trailer exposed to the water or like corrosive environment.

This invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which:

FIG. 1 is a top plan view of a boat trailer with the extension accessory attached thereto having the cradle portion thereof disclosed in its extended position in broken lines.

FIG. 2 is a side plan view with the extended position of the cradle means represented in broken lines as well as placement of a conventional marine craft or boat on the trailer assembly represented in broken lines.

FIG. 3 is a sectional view along line 3—3 of FIG. 1.

FIG. 4 is a schematic view showing the structural and operational details of the positioning means of the present invention.

FIG. 5 is a detailed view showing the rotational operation of the winch assembly.

Similar reference characters refer to similar parts throughout the several views of the drawings.

DETAILED DESCRIPTION

As shown in FIGS. 1 and 2 the present invention is primarily directed towards an accessory in the form of a support assembly for a boat trailer. The boat trailer itself is generally indicated as 10 and may comprise a number of substantially conventional designs. The trailer 10 is of the portable type wherein a towing vehicle is connected by means of a hitch member 12 to the frame of the trailer and the trailer travels on running gear generally indicated as 14. The frame of the trailer 16 also may be of substantially conventional design having a substantially elongated or longitudinal configuration wherein the bed of the trailer is sufficient to properly support the boat thereon. A plurality of roller means 18 and runner means 20 may be mounted directly on the frame of the trailer and affixed thereto so as to engage the undersurface of the boat 22 positioned thereon. A primary winch means 24 is affixed to the trailer as at 26 and serves to essentially lock or affix the boat 22 to the trailer bed by means of line 28 interconnecting connecting bolt 29 which is normally found on the bow or leading edge of the boat 22.

An important structural feature of the present invention is directed to the support assembly or trailer accessory generally indicated as 30 and comprising casing means 32 including at least two channel elements 34 which define on their interior channel passages in which the cradle means generally indicated as 36 is mounted. More specifically, the cradle means includes a cradle frame 38 having at least two leg elements 39 (FIG. 3) disposed within the channel passages 37 defined by the channel elements 34. By virtue of their corresponding configurations the leg elements 39 are slidably mounted within the channel passages and may be moved or positioned along the longitudinal dimension of the frame of the boat trailer.

A positioning means including winch assembly 40 and a cable assembly generally indicated as 42 is schematically represented in FIG. 4. More specifically, the cable assembly includes a first cable portion 44 interconnected directly between the winch assembly 40 and a first strut 46 of the cradle frame. The cable assembly further comprises a second cable portion 48 interconnected between first strut 46, a pulley assembly 49 and the winch assembly itself 40. The pulley assembly 49 is fixedly mounted to a rear portion as at 51 of the frame of the boat trailer 16. Accordingly, as represented in FIG. 5 the winch assembly 40 may be rotated in any direction indicated by directional arrow 52 in order to move the cradle frame 38 in opposite directions along the longitudinal dimension of the boat trailer. Therefore, first cable portion 44 and second cable portion 48 are concurrently connected to the winch assembly 40 and rotation in the proper direction causes movement of the cable portions 44 and 48 in opposite directions also as indicated by directional arrows 53 and 54. Therefore, rotation of the winch assembly 40 in the proper direction causes extension of the cradle frame 38 outwardly as indicated by directional arrow 55 by virtue of the connection of the second cable portion 48 to the strut 46 at point 47. Similarly interconnection of cable portion 44 at point 45 causes movement of the cradle member into its closed non-extended position.

Another structural feature of the present invention comprises walkway means generally indicated as 60 extending along the frame of the cradle and also, if desired, along a portion of the length of the boat trailer 16.

Guiding means in the form of rollers 64 serves to maintain the various cable portions 44 and 48 along their desired, intended path of travel.

It will thus be seen that the objects made apparent from the preceding description, are efficiently attained and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Now that the invention has been described,

1. A removable accessory for a conventional boat trailer have rearwardly extending frame portions, said accessory including a support assembly comprising: casing means connected to the frame portions of the boat trailer and disposed substantially along either side of a longitudinal axis thereof, said casing means comprising at least two channel means interconnected to one another and each disposed in depending, suspended relation to correspondingly positioned elongated portions of the boat trailer frame, each channel means defining cradle passages; said support assembly further comprising cradle means including a cradle frame, said cradle frame including at least two arm elements each slidably mounted for rearward movement within one of said cradle passages; positioning means movably interconnecting said cradle frame to said casing means and said cradle passages attached thereto, said positioning means comprising a single winch assembly mounted on the boat trailer, cable means comprising a first cable portion interconnected between said single winch assembly and said cradle frame and a second cable portion disposed in attached relation to both said single winch assembly and said cradle frame, pulley means connected to the boat trailer frame and disposed in engagement with said second cable portion between said winch assembly and said cradle frame along the path of travel defined by said second cradle portion; said cradle frame including a strut means attached thereto, each of said first and second cable portions connected to said strut means, and both of said first and second cable portions additionally connected concurrently to said single winch assembly, whereby rotation of said winch assembly in either direction causes movement of said cradle means relative to the longitudinal axis of the boat trailer.

2. An accessory for a boat trailer as in claim 1 wherein said casing means is in supported, depending relation to the boat trailer frame, whereby said accessory comprises said casing means and said movably mounted cradle means thereon.

3. An accessory as in claim 2 wherein said strut means comprises a first strut and a second strut disposed in spaced relation to one another on said cradle frame, each of said first and second cable portions connected to one of said first or second struts, and both of said first and second cable portions additionally connected concurrently to said winch assembly.

4. An accessory as in claim 3 wherein said pulley assembly is movably interconnected to said second cable portion between said winch assembly and said cradle frame along the path of said second cable.

5. An accessory as in claim 3 further comprising support means including roller and runner means mounted on said cradle frame and disposed in boat supporting relation to the boat trailer and a boat positioned thereon.

6. An accessory as in claim 3 wherein said cradle means is dimensioned and disposed to extend outwardly from the rear end of the boat trailer.

7. An accessory as in claim 1 further comprising walkway means extending along at least a portion of the length of said cradle frame.

8. An accessory as in claim 7 wherein said walkway means further extends along both said cradle frame and the boat trailer to which the cradle means is attached.

* * * * *